United States Patent [19]
Sarkisian et al.

[11] 3,788,081
[45] Jan. 29, 1974

[54] GROUTING COMPOSITION

[75] Inventors: Arthur Sarkisian, Cranford; Charles F. Murphy, Morristown, both of N.J.

[73] Assignee: International Telephone and Telegraph Corporation, New York, N.Y.

[22] Filed: Aug. 30, 1972

[21] Appl. No.: 284,942

[52] U.S. Cl............................ 61/36 R, 106/287 SS
[51] Int. Cl............................................ E02d 19/16
[58] Field of Search...61/36R; 106/287 SS; 166/294, 166/295

[56] References Cited
UNITED STATES PATENTS

| | | | |
|---|---|---|---|
| 3,706,581 | 12/1972 | Whitworth | 61/36 R |
| 3,686,872 | 8/1972 | Whitworth | 61/36 R |
| 3,490,933 | 1/1970 | Van Baricom | 61/36 R |
| 2,942,993 | 6/1960 | Handy | 61/36 R |
| 2,815,294 | 12/1957 | Havelin | 106/287 SS |

Primary Examiner—Mervin Stein
Assistant Examiner—Alex Grosz
Attorney, Agent, or Firm—C. C. Remsen, Jr.; J. B. Raden; H. J. Holt

[57] ABSTRACT

A grouting composition which, after setting, results in a grouted structure of improved dimensional and physical stability in air and of excellent stability in water comprising a mixture of (1) a gel-forming aqueous solution containing one part by weight solids content of (a) a vegetative polyphenolic material which is a tannin of the catechin or condensed type or an alkaline extract of coniferous tree barks, (b) an aldehyde and (c) a water soluble catalyst and (2) from four to seven parts by weight of fly ash, or modified fly ash, having a pH of at least seven.

10 Claims, No Drawings

GROUTING COMPOSITION

This invention relates to a grouting composition and to a process for producing a grouted structure utilizing said composition.

Chemical grouting compositions of the type injected in aqueous form into earth, sand, gravel or other porous formations and which subsequently solidify or gel to seal and reinforce such formations are well known. One such grouting system which has enjoyed wide commercial acceptance in the building and construction industry for stabilizing or consolidating earth or sand formations, stopping the flow of underground water, sealing foundation walls, increasing load bearing characteristics for tunneling operations and for a number of other uses is described in U.S. Pat. No. 3,391,542 to Herrick et al, assigned to the present assignee. The grouting system there disclosed is based upon water soluble polyphenolic materials extracted from vegetative sources such as tree barks and wood. The polyphenolic materials are dissolved in water and combined with formaldehyde and a water soluble catalyst, which react to form higher molecular weight gels that are substantially water insoluble and form strong and rigid grouted structures. For use in the filling of extensive voids, a number of fillers have been suggested such as cement, asbestose shorts, clays and other particulate materials.

The present invention is based upon the discovery that the stability of grouted structures of the aforementioned grouting compositions, based upon vegetative polyphenolics, is considerably improved by the addition of a critical amount a certain type of fly ash, a material that has hitherto been essentially a waste by-product produced by the combustion of powdered coal. The grouting compositions of the invention exhibit upon setting an unusual stability, unpredictable from a knowledge of the known properties of either the gel-forming vegetative polyphenolic or the fly ash that together make up the present composition. The compositions of the invention have demonstrated good dimensional and physical stability in air, and show excellent stability in water. Samples of the grouting compositions of the invention immersed in either neutral or acidified water have remained firm and intact for almost a year, whereas corresponding grouts with sand — rather than fly ash — have softened and started breaking down after a few days of similar exposure.

Specifically, the compositions of the invention comprise a mixture of (1) a gel-forming aqueous solution containing one part by weight solids content of (a) a vegetative polyphenolic material selected from the class consisting of tannins of the catechin and condensed type and alkaline extracts of coniferous tree barks, (b) an aldehyde, such as formaldehyde or paraformaldehyde, and (c) a water soluble catalyst and (2) from four to seven parts by weight of fly ash having a pH of at least seven. The compositions are prepared by thoroughly mixing a 15–40% aqueous solution of the gel-forming vegetative polyphenolic and fly ash to which may be added sand, earth, gravel, or other particulate solid material, depending upon the particular application intended. The particulate material may be added in amounts up to 50%, based on the combined weight of fly ash and particulate material. The compositions are mixed just prior to the time of use and then distributed or injected into the earth, sand or other porous formations to be stabilized, strengthened or sealed.

The gel-forming vegetative polyphenolics useful in the invention are described in the above-mentioned U.S. Pat. No. 3,391,542, and in U.S. Pat. No. 3,530,081 to Herrick et al. and U.S. Pat. 3,615,780 to Kim et al., all assigned to the present assignee. The disclosures of these three patents are hereby incorporated by reference. The first mentioned patent, U.S. Pat. No. 3,391,542, discloses a three component grouting composition of a vegetative polyphenolic, formaldehyde and a soluble salt of chromium, iron or aluminum as catalyst in up to a 40% water solution. The three components, in controlled proportions of 1 to 10 weight percent formaldehyde and 0.1 to 5 weight percent metal ion in said catalyst, based on the weight of dry polyphenolic, are thoroughly mixed at ambient temperatures, and injected into the porous formation to be grouted. At a precalculated time, they will gel to form a grouted structure. The vegetative polyphenolics are the alkaline extracts of coniferous tree barks or the neutral or alkaline catechin or condensed tannin extracts of quebracho, mangrove, mimosa or wattle wood. U.S. Pat. No. 3,530,081 discloses higher strength grouted structures obtained by reacting the catalytic iron salt with a polyol to form an iron-hydroxide-polyol complex. The third patent, U.S. Pat. No. 3,615,780, discloses the use as catalysts of water-soluble alkali metal silicates. The present invention is useful with all of the aforementioned gel-forming vegetative polyphenolic compositions and further and more complete information concerning their preparation is set forth in the foregoing patents.

The fly ash used in the invention is produced by combustion of powdered coal with forced draft, and is often carried off with the flue gases from such processes. Special equipment is necessary for its effective recovery. It is commercially available in large quantities as a low cost raw material for use in cements, and as a filler in such materials as asphalt and road bases. However, less than a fifth of the many millions of tons collected has found useful outlets. Fly ashes from all sources are not useful in the invention. It has been found the properties of grouted forms in both water and air vary considerably depending upon the pH of the fly ash. Grouts containing fly ash of low pH in water (4 to 5) did not perform well. Fly ash samples that are naturally slightly alkaline in water, having a pH of 8 to 11, formed the highest quality grouts. However, satisfactory results were obtained if the acidic fly ashes were neutralized with, for example, lime. Thus, the fly ash should be either fly ash which is naturally neutral or preferably at least slightly alkaline or fly ash which is modified to have a pH of at least seven, preferably 8 to 11.

The following examples illustrate the practice of the invention. All parts are by weight unless otherwise indicated.

EXAMPLE 1

The vegetative polyphenolic used in this example was a 50 — 50 blend of an alkaline extract of Western Hemlock bark and the condensed tannin extract from Quebracho wood. Fly ash having a pH of about 9.5 was mixed with a 700 ml., 20% water solution of this polyphenolic blend, containing 154 grams of solids, in a torque viscometer as viscosity readings were taken.

Viscosity increased gradually from 8 centipoises (without fly ash) to 400 centipoises at 5.5 parts fly ash. Further additions of fly ash caused a break upward in the viscosity to 570 centipoises at 6.3 parts and 920 centipoises at 6.9 parts fly ash.

A mixture prepared as above containing 5 parts fly ash per 1 part polyphenolic solids were made. It was catalyzed with a 5% sodium dichromate setting agent (using a 10/1 volume ratio of polyphenolic to setting agent solution) and 5% formaldehyde, based on polyphenolic solids. The mixture was poured into a number of waxed paper cups and gelled in ten minutes. Unconfined hardness was measured by Proctor Penetrometer using a ¼ inch probe. After three days in a protected environment, to prevent moisture loss, the hardness was measured at 400 psi. After exposure to the atmosphere (ambient room conditions), it was found that there was little or no evidence of the stress cracking, or crumbling which occurs in similar grouts containing sand in place of fly ash. Immersion of the grout forms in water, both neutral and slightly acidic, resulted in no breakdown or sloughing after several months of immersion.

Other forms such as hollowed out cylinders were made from the above compositions with up to ½ inch wall thickness. All exhibited results similar to those set forth above as long as air exposure was avoided to prevent moisture loss for 2 to 3 days after pouring the mixture.

EXAMPLE 2

Three grouting compositions were prepared. The first composition contained a 50/50 blend of bark/condensed tannin polyphenolics set out in Example 1. The second and third mixtures contained only Western Hemlock polyphenolic bark extract but were otherwise prepared as set forth in Example 1. Mixtures one and two contained fly ash, the third, for comparative purposes, did not. The mixtures were poured over damp 35 mesh sand to produce a water barrier in 3 inch glass pipes. An equivalent of 2 gallons/square yard of solution was used. All were given a 3 hour setting time and then sand was poured over the grouting layer. Water was added to a depth of 3 feet above the sand. The three test compositions were as follows:

| Grouting Mixture | Grams Fly Ash |
|---|---|
| 1. 50 ml. 20% solution 50/50 Bark/Condensed Tannin Polyphenolic | 56 |
| 2. 50 ml. 25% Solution Bark Polyphenolic | 54 |
| 3. 50 ml. 25% Solution Bark Polyphenolic | 100 (Sand) |

Water seepage in the first two pipes was less than 0.01 ft$^3$/-ft$^2$/day and gradually tapered off so that it was essentially negligible. After 7 months, there was less than 1½ inches drop in the water level. In the third pipe without fly ash, but with sand, intial seepage was 0.10 ft.$^3$/ft.$^2$/-day, which tapered off to 0.03 in about a week and averaged 0.03 to 0.05 thereafter.

EXAMPLE 3

A series of tests was run with blends of both sand and fly ash in various proportions with polyphenolic grouting compositions to check stability of the grouted forms. 100, 200 and 300 gram portions of fly ash were mixed with 250 ml. of 20% solutions of the polyphenolic mixture and then sand was added in amounts sufficient to make a pourable mass which could be transferred to a paper cup. Increasing proportions of sand increased the tendency to some sloughing from the exposed surfaces, as shown below:

| | Grams | | Results of exposure to— | |
|---|---|---|---|---|
| Grouting mixture | Fly ash | Sand | Dry air | Water submersion |
| 1... 250 ml. 20% solution 50/50 bark extract/ condensed tannin polyphenolic. | 100 | 350–400 | Some sloughing. | Some sloughing. |
| 2... Bark/tannin, same as in (l). | 200 | 250–300 | Very slight sloughing. | Very slight sloughing. |
| 3........do................ | 300 | 150–200 | No sloughing. | No sloughing. |

The foregoing results of the compositions of the invention should be contrasted with the results of corresponding compositions, without fly ash, in which exposure to air results in drying out and disintegration, and direct exposure to water causes swelling and ultimate disintegration. The present compositions, on the other hand, are stable in water and air. They can also be shaped into useful forms such as cylinders or pipes, a result not possible without the addition of fly ash.

The grouting compositions of the invention thus lend themselves to use as grout for direct contact in surface and underground water conditions, for grouting large voids, for sealing or blocking water flow and for land fill. Specific applications are blocking acid mine waters, as low cost soil piping and in pond linings for porous basins.

We claim:

1. A grouting composition comprising a mixture of
   a gel-fomring aqueous solution containing one part by weight solids content of
   a. a vegetative polyphenolic material selected from the group consisting of tannins of the catechin and condensed type and alkaline extracts of coniferous tree bark
   b. an aldehyde selected from the group consisting of formaldehyde and paraformaldehyde and
   c. a water soluble catalyst selected from the group consisting of an iron hydroxide-polyol complex, alkali metal silicate and salts of chromium, iron and aluminum and
   from 4 to 7 parts by weight of fly ash having a pH of at least seven.

2. The grouting composition of claim 1 containing a dichromate catalyst.

3. The grouting composition of claim 1 in which the aldehyde is formaldehyde.

4. The grouting composition of claim 1 containing 1 to 10 percent aldehyde, from 0.1 to 5 percent catalyst based on the ion, said percentages being based on the weight of dry polyphenolic.

5. The grouting composition of claim 1 containing up to about 50 percent sand based on the total weight of sand and fly ash.

6. The grouting composition of claim 1 in which the fly ash has a pH of 8 to 11.

7. A grouted structure comprising the set composition of claim 1.

8. A process for producing a grouted structure comprising
   mixing a grouting composition comprising
   a gel-forming aqueous solution containing one part by weight solids content of a. a vegetative polyphenolic material selected from the group consisting of tannins of the catechin and condensed type and alkaline extracts of coniferous tree bark
b. an aldehyde selected from the group consisting of formaldehyde and paraformaldehyde and
c. a water soluble catalyst selected from the group consisting of an iron hydroxide-polyol complex, alkali metal silicate and salts of chromium, iron and aluminum and from 4 to 7 parts by weight of fly ash having a pH of at least 7 and distributing said grouting composition into a porous formation.

9. The process of claim 8 in which the pH of the fly ash is between 8 and 11.

10. The process of claim 8 in which air exposure of the grouting composition after mixing is avoided for a period of at least several days.

* * * * *